United States Patent
Yoshida et al.

(10) Patent No.: US 11,735,959 B2
(45) Date of Patent: Aug. 22, 2023

(54) WIRELESS POWER FEEDING SYSTEM AND POWER RECEPTION DEVICE

(71) Applicant: Mitsubishi Electric Corporation, Tokyo (JP)

(72) Inventors: Hidehito Yoshida, Tokyo (JP); Takuya Nakanishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 194 days.

(21) Appl. No.: 17/428,651

(22) PCT Filed: Apr. 1, 2019

(86) PCT No.: PCT/JP2019/014424
§ 371 (c)(1),
(2) Date: Aug. 5, 2021

(87) PCT Pub. No.: WO2020/202422
PCT Pub. Date: Oct. 8, 2020

(65) Prior Publication Data
US 2022/0131413 A1    Apr. 28, 2022

(51) Int. Cl.
*H02J 50/12* (2016.01)
*H02J 50/90* (2016.01)

(52) U.S. Cl.
CPC ............. *H02J 50/12* (2016.02); *H02J 50/90* (2016.02)

(58) Field of Classification Search
CPC ................................. H02J 50/12; H02J 50/90
(Continued)

(56) References Cited

U.S. PATENT DOCUMENTS

| 9,318,258 B2 * | 4/2016 | Yamakawa | ............... H01Q 7/00 |
| 2015/0048688 A1 * | 2/2015 | Yamakawa | ........... B60L 53/126 |
| | | | 307/104 |

(Continued)

FOREIGN PATENT DOCUMENTS

| JP | 2013-183496 A | 9/2013 |
| JP | 2015-89267 A | 5/2015 |

(Continued)

OTHER PUBLICATIONS

International Search Report and Written Opinion dated Jun. 18, 2019, received for PCT Application PCT/JP2019/014424, Filed on Apr. 1, 2019, 10 pages including English Translation.

(Continued)

*Primary Examiner* — Alfonso Perez Borroto
(74) *Attorney, Agent, or Firm* — Xsensus LLP

(57) ABSTRACT

A wireless power feeding system includes: a power transmission circuit portion for converting DC power supplied from a main power supply, to AC power, and for supplying the AC power to a power-transmission-side coil; input power control means for controlling the AC power to be supplied to the power-transmission-side coil; a power-reception-side coil which is magnetically coupled with the power-transmission-side coil and to which AC power is transmitted from the power-transmission-side coil through magnetic energy accumulated between the power-reception-side coil and the power-transmission-side coil; a power reception circuit including a rectifier for converting the AC power transmitted to the power-reception-side coil, to DC, and a power-reception-side DC/DC converter; and power reception circuit control means for controlling rectifier output voltage to be a maximum efficiency voltage at which power transmission efficiency becomes maximum.

12 Claims, 5 Drawing Sheets

(58) Field of Classification Search
USPC .......................................................... 307/104
See application file for complete search history.

(56) References Cited

U.S. PATENT DOCUMENTS

| | | |
|---|---|---|
| 2015/0054456 A1 | 2/2015 | Yamakawa et al. |
| 2015/0061580 A1* | 3/2015 | Yamakawa ............. H02J 50/80 320/108 |
| 2015/0115731 A1 | 4/2015 | Wakabayashi |
| 2018/0358843 A1 | 12/2018 | Misawa |
| 2021/0021159 A1 | 1/2021 | Misawa |

FOREIGN PATENT DOCUMENTS

| | | |
|---|---|---|
| JP | 2015-116023 A | 6/2015 |
| JP | 2017-93094 A | 5/2017 |
| JP | 2018-207731 A | 12/2018 |

OTHER PUBLICATIONS

Kobayashi et al., "Real-time Maximum Efficiency Control in Dynamic Wireless Power Transfer System", IEEJ Transactions on Industry Applications, vol. 136, No. 6, 2016, pp. 425-432. (Including English Abstract).

* cited by examiner

WIRELESS POWER FEEDING SYSTEM AND POWER RECEPTION DEVICE

CROSS-REFERENCE TO RELATED APPLICATION

The present application is based on PCT filing PCT/JP2019/014424, filed Apr. 1, 2019, the entire contents of which are incorporated herein by reference.

TECHNICAL FIELD

The present application relates to a wireless power feeding system and a power reception device.

BACKGROUND ART

Wireless power feeding technologies are for transmitting power between a power transmission side and a power reception side that are in a non-contact state with each other. A wireless power feeding system that performs magnetic-field-coupling-type wireless power feeding, which is one of wireless power feeding technologies, transmits power from the power transmission side to the power reception side by magnetic coupling between a power-transmission-side coil and a power-reception-side coil disposed with a space therebetween. In such a wireless power feeding system, the power transmission efficiency and the operation state of the system are influenced by the degree of magnetic coupling between the power transmission and reception coils. Therefore, performing maximum efficiency control by estimating the degree (coupling coefficient) of magnetic coupling through a predetermined calculation, and by controlling output voltage (secondary-side voltage) on the power reception side in accordance with an estimation value of the coupling coefficient has been proposed (e.g., see Non-Patent Document 1).

CITATION LIST

Non-Patent Document

Non-Patent Document 1: Daita Kobayashi and two others, "Real-time Maximum Efficiency Control in Dynamic Wireless Power Transfer System", IEEJ Trans. IA, Vol. 136, No 6 (2016), 425-432

SUMMARY OF THE INVENTION

Problems to be Solved by the Invention

In a wireless power feeding system, for reasons of circuit configuration and control, input power is increased when the coupling coefficient is small. In Non-Patent Document 1, it is assumed that the coupling coefficient during power feeding is sufficiently large. However, in actual power feeding, the power-transmission-side coil and the power-reception-side coil may be distanced from each other, which may decrease the coupling coefficient. Therefore, the technology of Non-Patent Document 1 has a problem that input power may become excessive.

The present application discloses a technology for solving the above problem. An object of the present application is to obtain a wireless power feeding system and a power reception device that can perform maximum efficiency control while preventing input power to the system from becoming excessive even when relative positions of the power-transmission-side coil and the power-reception-side coil have been changed.

Solution to the Problems

A wireless power feeding system disclosed in the present application includes: a power transmission circuit portion for converting DC power supplied from a main power supply, to AC power; a power-transmission-side coil which is supplied with the AC power from the power transmission circuit portion; input power control means for controlling the AC power to be supplied to the power-transmission-side coil by causing input power to the system to converge on a constant input power command value during a settling time determined in advance; a power-reception-side coil which is magnetically coupled with the power-transmission-side coil supplied with the AC power from the power transmission circuit portion, and to which AC power is transmitted from the power-transmission-side coil through magnetic energy accumulated between the power-reception-side coil and the power-transmission-side coil; a power reception circuit including a rectifier for converting the AC power transmitted to the power-reception-side coil, to DC, and a power-reception-side DC/DC converter for converting output voltage from the rectifier; and reception voltage control means for performing reception voltage control in which the output voltage from the rectifier is converged to be a maximum efficiency voltage at which power transmission efficiency becomes maximum, wherein when relative positions of the power-transmission-side coil and the power-reception-side coil are changed, the reception voltage control means obtains a degree of magnetic coupling between the power-transmission-side coil and the power-reception-side coil after the change of the relative positions on the basis of the output voltage from the rectifier, and updates the maximum efficiency voltage by calculating in real time a maximum efficiency voltage after the change of the relative positions on the basis of the degree of magnetic coupling, and one or both of an update cycle of the maximum efficiency voltage and a control cycle of the reception voltage control are, in a range of being able to follow variation in the maximum efficiency voltage, not less than the settling time.

Effect of the Invention

According to the wireless power feeding system disclosed in the present application, it is possible to obtain a wireless power feeding system that can perform maximum efficiency control while preventing input power to the system from becoming excessive even when relative positions of the power-transmission-side coil and the power-reception-side coil have been changed.

DESCRIPTION OF EMBODIMENTS

Embodiment 1

Figure 1:
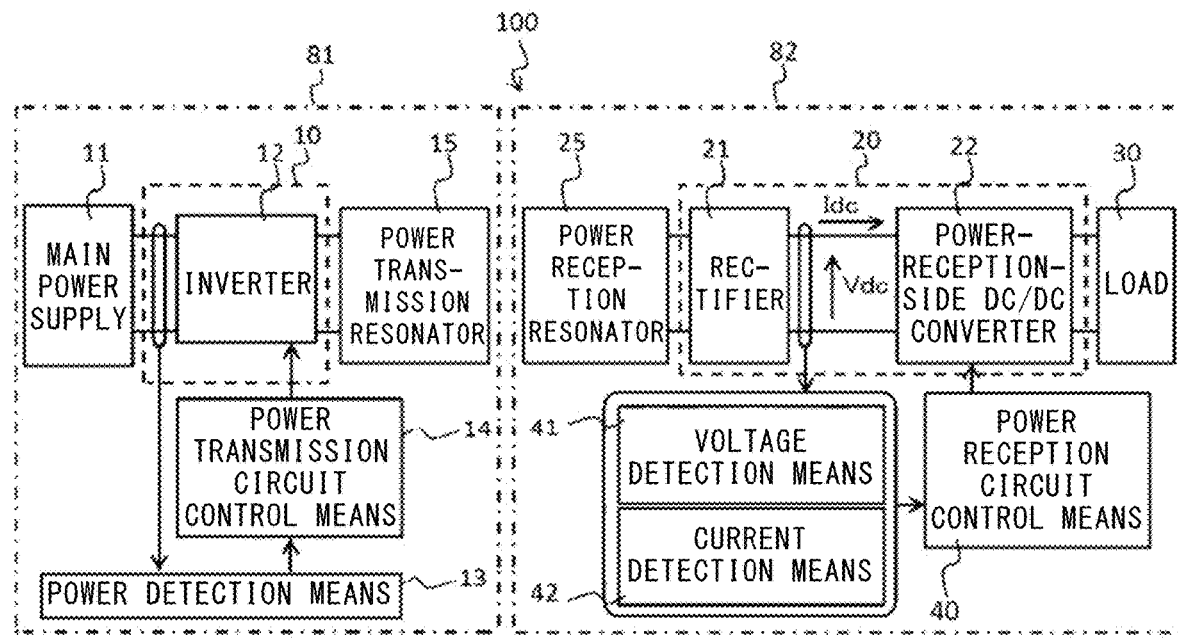
FIG. 1 is a configuration diagram showing a wireless power feeding system according to embodiment 1.
Figure 2:
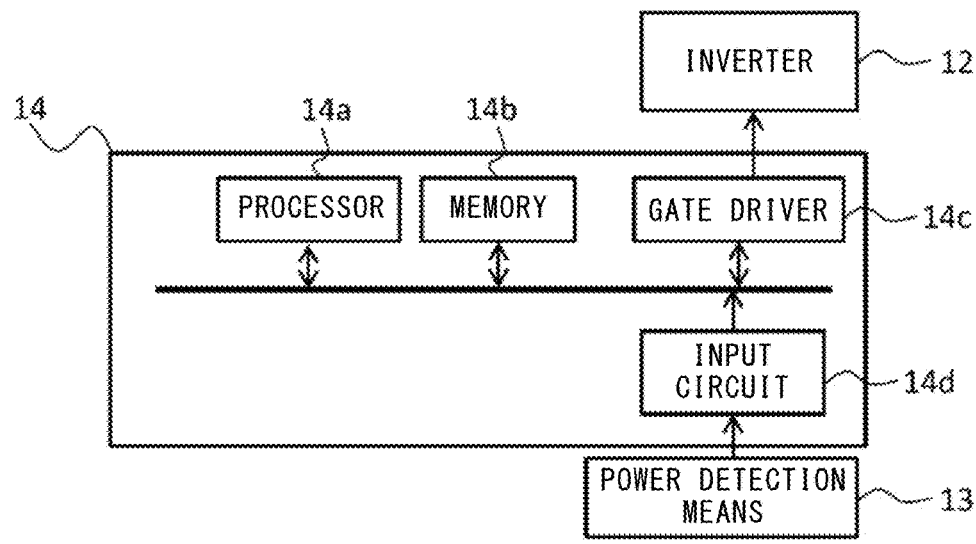
FIG. 2 shows an example of a hardware configuration of power transmission circuit control means according to embodiment 1.
Figure 3:
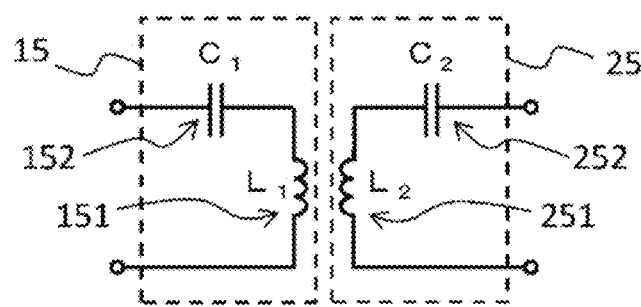
FIG. 3 shows an example of a power transmission resonator and a power reception resonator according to embodiment 1.

Hereinafter, embodiment 1 is described with reference to FIG. 1 to FIG. 5. FIG. 1 is a configuration diagram showing a wireless power feeding system according to embodiment 1. FIG. 2 shows an example of a power transmission resonator and a power reception resonator according to embodiment 1. A wireless power feeding system 100 includes a power transmission device 81 and a power reception device 82. The power transmission device 81 includes: a main power supply 11; a power transmission circuit portion 10 including an inverter 12; power detection means 13 which detects power between the main power supply 11 and the inverter 12; power transmission circuit control means 14, i.e., input power control means, which controls the inverter 12; and a power transmission resonator 15. The power reception device 82 includes a power reception circuit 20, a power reception resonator 25, and a load 30. The power transmission circuit portion 10 converts DC power supplied from the main power supply 11, to AC power, and supplies the AC power to the power transmission resonator 15. The AC power supplied to the power transmission resonator 15 is transmitted to the power reception resonator 25 through magnetic energy as described later. The AC power transmitted to the power reception resonator 25 is supplied to the load 30 via the power reception circuit 20.

The main power supply 11 outputs DC voltage and inputs DC power to the inverter 12. The DC power inputted from the main power supply 11 is converted to desired AC power by the inverter 12, and the resultant AC power is supplied to the power transmission resonator 15. At this time, the DC power to be inputted from the main power supply 11 to the inverter 12 is detected by the power detection means 13, and the detection result is inputted to the power transmission circuit control means 14. On the basis of the detection result by the power detection means 13, the power transmission circuit control means 14 performs input power control such that DC input power Pin to be inputted to the inverter 12 has a constant input power command value Pin*. More specifically, a drive signal is generated such that the input power Pin has the input power command value Pin*, and the drive signal is transmitted to a switching element (not shown) forming the inverter 12, whereby the input power control is performed. Accordingly, AC power to be supplied to the power transmission resonator 15 is also controlled.

In embodiment 1, the power detection means 13 is connected between the main power supply 11 and the inverter 12, to detect DC power to be inputted to the inverter 12, and input power control is performed with respect to the DC power to be inputted to the inverter 12. However, input power control may be performed using output power of the inverter as the input power Pin, and the inverter 12 may be controlled such that the output power of the inverter 12 becomes constant. In this case, the power detection means 13 is connected so as to detect power between the inverter 12 and the power transmission resonator 15. Since the output power of the inverter 12 is AC, control is performed such that, for example, the effective value becomes the input power command value Pin*.

Here, a hardware configuration that realizes the power transmission circuit control means 14 is described. FIG. 2 shows an example of a hardware configuration of power transmission circuit control means according to embodiment 1. The power transmission circuit control means 14 is mainly composed of: a processor 14a; a memory 14b; a gate driver 14c which transmits a drive signal to a semiconductor switching element (not shown) forming the inverter 12; and an input circuit 14d which receives an input from the power detection means 13. The processor 14a is, for example, a CPU (Central Processing Unit), a microcomputer, a DSP (Digital Signal Processor), or the like. The memory 14b is, for example, a volatile memory such as a RAM (Random Access Memory), a non-volatile memory such as a ROM (Read Only Memory) or a flash memory, or a magnetic disk such as a hard disk. The memory 14b has stored therein a predetermined program executed by the processor 14a. The processor 14a reads out the program as appropriate and executes the program to perform various calculation processes. The calculation result by the processor 14a is stored into the memory 14b as necessary. The gate driver 14c generates a drive signal having a predetermined frequency and a predetermined duty cycle, on the basis of the calculation result by the processor 14a, and transmits the drive signal to the semiconductor switching element forming the inverter 12.

The power transmission resonator 15 and the power reception resonator 25 are each a resonance circuit which includes at least one coil, and are designed so as to respectively have predetermined resonance frequencies. As in the example shown in FIG. 3, the power transmission resonator 15 is formed by connecting, in series, a power-transmission-side coil 151 having a self-inductance of L1, and a power-transmission-side capacitor 152 having a capacitance of C1. The power reception resonator 25 is formed by connecting, in series, a power-reception-side coil 251 having a self-inductance of L2, and a power-reception-side capacitor 252 having a capacitance of C2. The power-transmission-side coil 151 and the power-transmission-side capacitor 152 are designed so as to resonate at a predetermined resonance frequency $\omega 01$. The power-reception-side coil 251 and the power-reception-side capacitor 252 are designed so as to resonate at a predetermined resonance frequency $\omega 02$.

The power-transmission-side coil 151 and the power-reception-side coil 251 are magnetically coupled by resonance, and magnetic energy is accumulated in the space between the power-transmission-side coil 151 and the power-reception-side coil 251. Electric energy of AC power supplied to the power transmission resonator 15 is transmitted to the power reception resonator 25 through this magnetic energy. The power transmitted to the power reception resonator 25 is inputted to the power reception circuit 20, is subjected to power conversion in the power reception circuit 20, and then is supplied to the load 30.

Adjustment of the resonance frequency $\omega 01$ and the resonance frequency $\omega 02$ may be performed by, for example, implementing the power-transmission-side capacitor 152 and the power-reception-side capacitor 252 as variable capacitors and adjusting the respective capacitances C1 and C2. The resonance frequency ω01 and the resonance frequency ω02 are not limited in particular. The example shown in FIG. 3 adopts a circuit configuration in which the power-reception-side coil 251 and the power-reception-side capacitor 252 are connected in series in the power reception resonator 25. However, a circuit configuration in which the power-reception-side coil 251 and the power-reception-side capacitor 252 are connected in parallel may be adopted.

The power reception circuit 20 functions as a power converter by being connected between the power reception resonator 25 and the load 30. In the power reception circuit 20, a rectifier 21 and a power-reception-side DC/DC converter 22 are provided in this order from the power reception resonator 25 side. The rectifier 21 converts AC power inputted from the power reception resonator 25, to DC, and outputs DC rectifier output voltage Vdc and DC rectifier output current Idc. The power-reception-side DC/DC converter 22 converts the rectifier output voltage Vdc to a predetermined voltage, and outputs the resultant voltage to the load 30. The rectifier output voltage Vdc and the rectifier output current Idc are detected by voltage detection means 41 and current detection means 42, respectively. The power-reception-side DC/DC converter 22 may be an insulation-type DC/DC converter, or may be a non-insulation-type DC/DC converter.

The load 30 is a motor, a battery, or the like, and is not limited in particular.

The power-reception-side DC/DC converter 22 is controlled by power reception circuit control means 40, i.e., reception voltage control means. The power reception circuit control means 40 performs reception voltage control by controlling the power-reception-side DC/DC converter 22 on the basis of the rectifier output voltage Vdc and the rectifier output current Idc detected by the voltage detection means 41 and the current detection means 42.

The hardware configuration that realizes the power reception circuit control means 40 is the same as the hardware configuration of the power transmission circuit control means 14 described with reference to FIG. 2. Although not shown, it is sufficient that the power transmission circuit control means 14, the inverter 12, and the power detection means 13 in FIG. 2 are replaced with the power reception circuit control means 40, the power-reception-side DC/DC converter 22, and the voltage detection means 41 and the current detection means 42.

Figure 4:
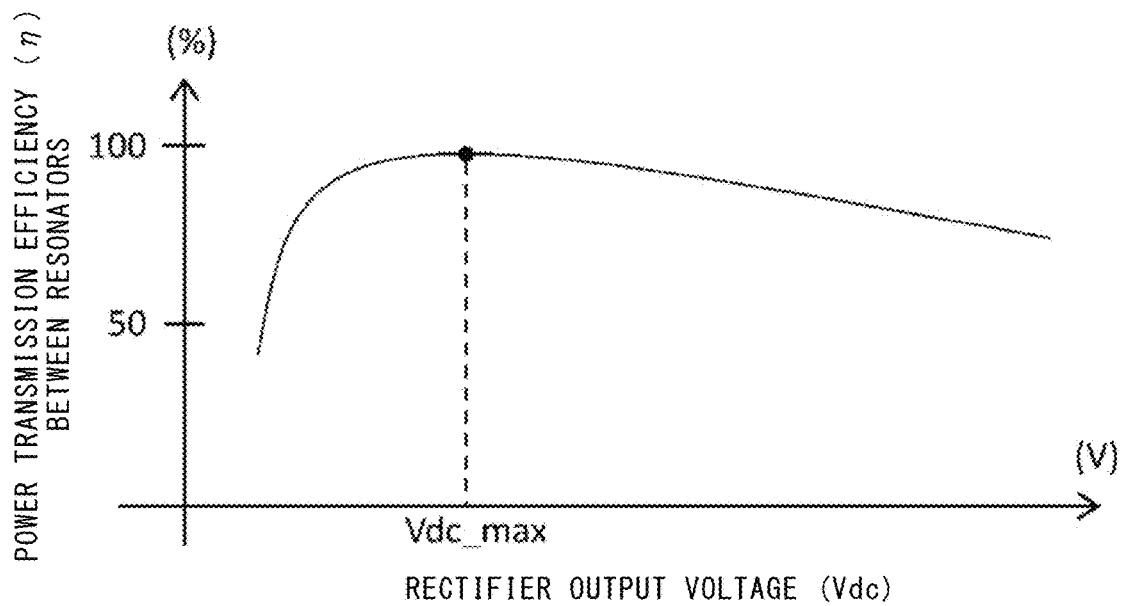
FIG. 4 shows an example of the relationship between rectifier output voltage and power transmission efficiency between the power transmission resonator and the power reception resonator.

Next, reception voltage control by the power reception circuit control means 40 is described. In the reception voltage control by the power reception circuit control means 40, the rectifier output voltage Vdc is controlled so as to maximize the power transmission efficiency between the power transmission resonator 15 and the power reception resonator 25. FIG. 4 shows an example of the relationship between the rectifier output voltage and the power transmission efficiency between the resonators. As shown in FIG. 4, power transmission efficiency η between the resonators is dependent on the rectifier output voltage Vdc, and there is a rectifier output voltage Vdc (hereinafter, referred to as maximum efficiency voltage Vdc_max) at which the power transmission efficiency η becomes maximum. The power reception circuit control means 40 calculates the maximum efficiency voltage Vdc_max on the basis of the rectifier output voltage Vdc and the rectifier output current Idc, and generates a drive signal that causes the rectifier output voltage Vdc to be the maximum efficiency voltage Vdc_max. The power reception circuit control means 40 transmits the generated drive signal to a switching element (not shown) forming the power-reception-side DC/DC converter 22, to control the power-reception-side DC/DC converter 22. Accordingly, the power-reception-side DC/DC converter 22 is controlled such that the rectifier output voltage Vdc becomes the maximum efficiency voltage Vdc_max, whereby reception voltage control that maximizes the power transmission efficiency η is performed.

Figure 5:
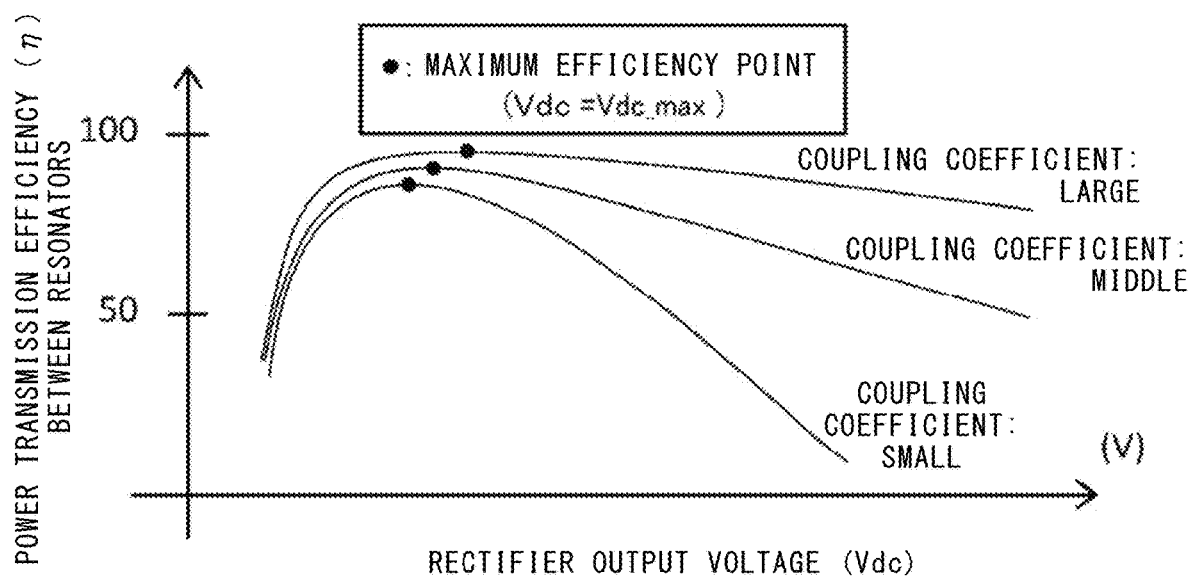
FIG. 5 shows examples of change in the relationship between the rectifier output voltage and the power transmission efficiency between the power transmission resonator and the power reception resonator, for respective different coupling coefficients.

The maximum efficiency voltage Vdc_max is dependent on a coupling coefficient, which is the degree of magnetic coupling between the power-transmission-side coil 151 and the power-reception-side coil 251. FIG. 5 shows examples of change in the relationship between the rectifier output voltage and the power transmission efficiency between the power transmission resonator and the power reception resonator, for respective different coupling coefficients. As shown in FIG. 5, when the coupling coefficient is different, the relationship between the rectifier output voltage Vdc and the power transmission efficiency η between the resonators also changes, and the maximum efficiency voltage Vdc_max is also different. The coupling coefficient is determined in accordance with respective self-inductances of the power-transmission-side coil 151 and the power-reception-side coil 251 and mutual inductance between the power-transmission-side coil 151 and the power-reception-side coil 251. Therefore, the coupling coefficient changes in accordance with the shape of the power-transmission-side coil 151, the shape of the power-reception-side coil 251, the relative position of the power-reception-side coil 251 to the power-transmission-side coil 151, and the like. Thus, when the relative positions of the power-transmission-side coil 151 and the power-reception-side coil 251 are changed during operation, the reception voltage control needs to be performed while the maximum efficiency voltage Vdc_max is calculated in real time in accordance with change in the coupling coefficient.

As a method for calculating in real time the maximum efficiency voltage Vdc_max in accordance with the coupling coefficient, there is a method that uses the relationship of the rectifier output voltage Vdc and the power transmission efficiency η between the resonators shown in FIG. 5. As shown in FIG. 5, when the coupling coefficients are different, the curves each representing the relationship between the rectifier output voltage Vdc and the power transmission efficiency η are different from each other, and the curves do not cross each other. This indicates that when a combination of a rectifier output voltage Vdc and a power transmission efficiency η is determined, a coupling coefficient is uniquely determined. Then, when the coupling coefficient is determined, a curve representing the rectifier output voltage Vdc and the characteristic of the power transmission efficiency η is also uniquely determined. Accordingly, the maximum efficiency point at which Vdc=Vdc_max is realized is also uniquely determined. Using this, the maximum efficiency voltage Vdc_max is calculated from the determined characteristic of the power transmission efficiency η. Alternatively, a correspondence relationship between coupling coefficient and maximum efficiency voltage Vdc_max may be stored in advance in a memory, i.e., a storage unit, of the power reception circuit control means 40, and when reception voltage control is to be performed, a coupling coefficient may be determined from the combination of the rectifier output voltage Vdc and the power transmission efficiency η between the resonators, and the maximum efficiency voltage Vdc_max may also be obtained. In this case, the calculation amount in the power reception circuit control means 40 can be reduced and the calculation time necessary for the control can be shortened.

The power transmission efficiency η between the resonators is calculated by dividing output power Pout indicating the power transmitted from the power transmission device 81 to the power reception device 82, by the input power Pin. The output power Pout is calculated by multiplying the rectifier output voltage Vdc by the rectifier output current Idc. The calculation of the power transmission efficiency η is performed on the assumption that the input power Pin is controlled to be constant at the input power command value Pin*.

On the basis of the combination of the power transmission efficiency η between the resonators calculated as described above, and the rectifier output voltage Vdc detected by the voltage detection means 41, a coupling coefficient is determined and the maximum efficiency voltage Vdc_max is obtained. The calculation method for the maximum efficiency voltage Vdc_max described above is an example. The maximum efficiency voltage Vdc_max may be calculated according to another method.

As described above, in embodiment 1, the rectifier output voltage Vdc is detected, and the duty cycle of the drive signal is changed on the basis of the rectifier output voltage Vdc and the maximum efficiency voltage Vdc_max. As a generation method for the drive signal, open-loop control may be performed by using a fixed duty cycle. However, from the viewpoint of preventing control deviation, it is preferable that closed-loop control is performed by detecting the rectifier output voltage Vdc as in embodiment 1.

In embodiment 1, the rectifier output voltage Vdc and the rectifier output current Idc are detected, and by using these, the maximum efficiency voltage Vdc_max is calculated. For the calculation of the maximum efficiency voltage Vdc_max, the voltage detection means 41 and the current detection means 42 may be connected between the power reception resonator 25 and the power reception circuit 20, and calculation may be performed by using the voltage and current outputted from the power reception resonator 25. However, from the viewpoint of facilitating signal processing, it is preferable to calculate the maximum efficiency voltage Vdc_max from the rectifier output voltage Vdc and the rectifier output current Idc as in embodiment 1. Since the voltage and current outputted from the power reception resonator 25 are high frequency AC voltage and AC current, when the maximum efficiency voltage Vdc_max is calculated from these, signal processing for obtaining the effective value is required. Since the rectifier output voltage Vdc and the rectifier output current Idc have been converted into DC, such signal processing is not required.

According to embodiment 1, it is possible to obtain a wireless power feeding system that can perform maximum efficiency control while preventing input power to the system from becoming excessive even when the relative positions of the power-transmission-side coil and the power-reception-side coil have been changed. More specifically, the power transmission circuit control means which controls input power supplied to the power-transmission-side coil of the power transmission resonator is provided. Accordingly, even when the relative positions of the power-transmission-side coil and the power-reception-side coil are changed and thereby the coupling coefficient is changed, the input power can be prevented from becoming excessive. In addition, the power reception device includes the power reception circuit control means, and reception voltage control is performed by this power reception circuit control means. In the reception voltage control, from the combination of a rectifier output voltage and a power transmission efficiency, the maximum efficiency voltage corresponding to the present coupling coefficient is obtained, and the rectifier output voltage is controlled so as to be the obtained maximum efficiency voltage. Since the input power control on the power transmission side and the reception voltage control on the power reception side are respectively performed, maximum efficiency control can be performed while preventing the input power to the system from becoming excessive even when the relative positions of the power-transmission-side coil and the power-reception-side coil have been changed.

In the reception voltage control, the rectifier output voltage is detected and closed-loop control is performed. Therefore, occurrence of control deviation can be prevented.

In the calculation of the maximum efficiency voltage, the DC rectifier output voltage and the rectifier output current are detected, and these are used in calculation of the maximum efficiency voltage. This facilitates processing of signals transmitted from the voltage detection means and the current detection means.

Embodiment 2

Figure 6:
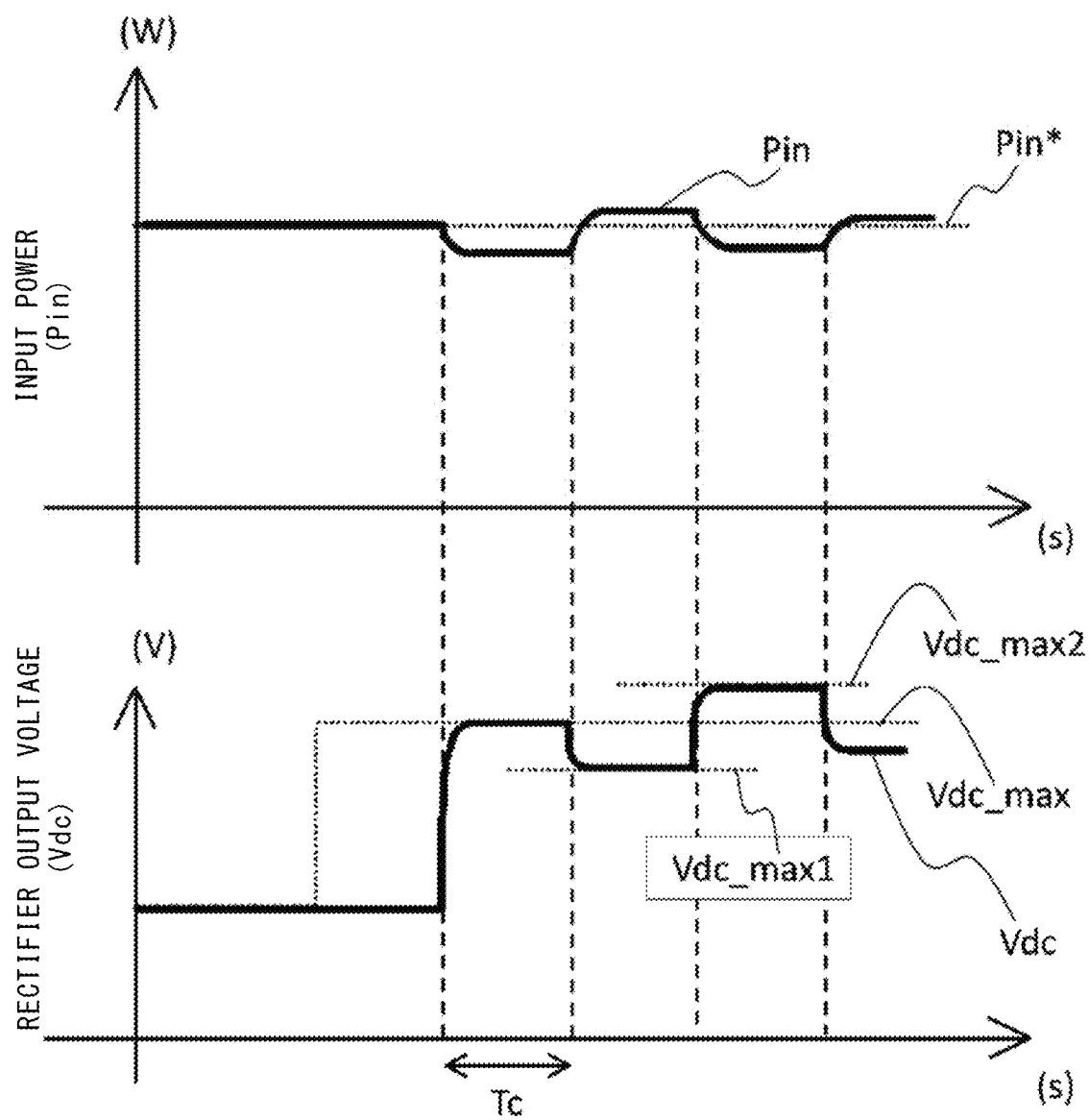
FIG. 6 is a diagram of comparing temporal variation of input power and temporal variation of the rectifier output voltage, the diagram showing a case where the control cycle of input power control and the control cycle of reception voltage control are equal to each other.
Figure 7:
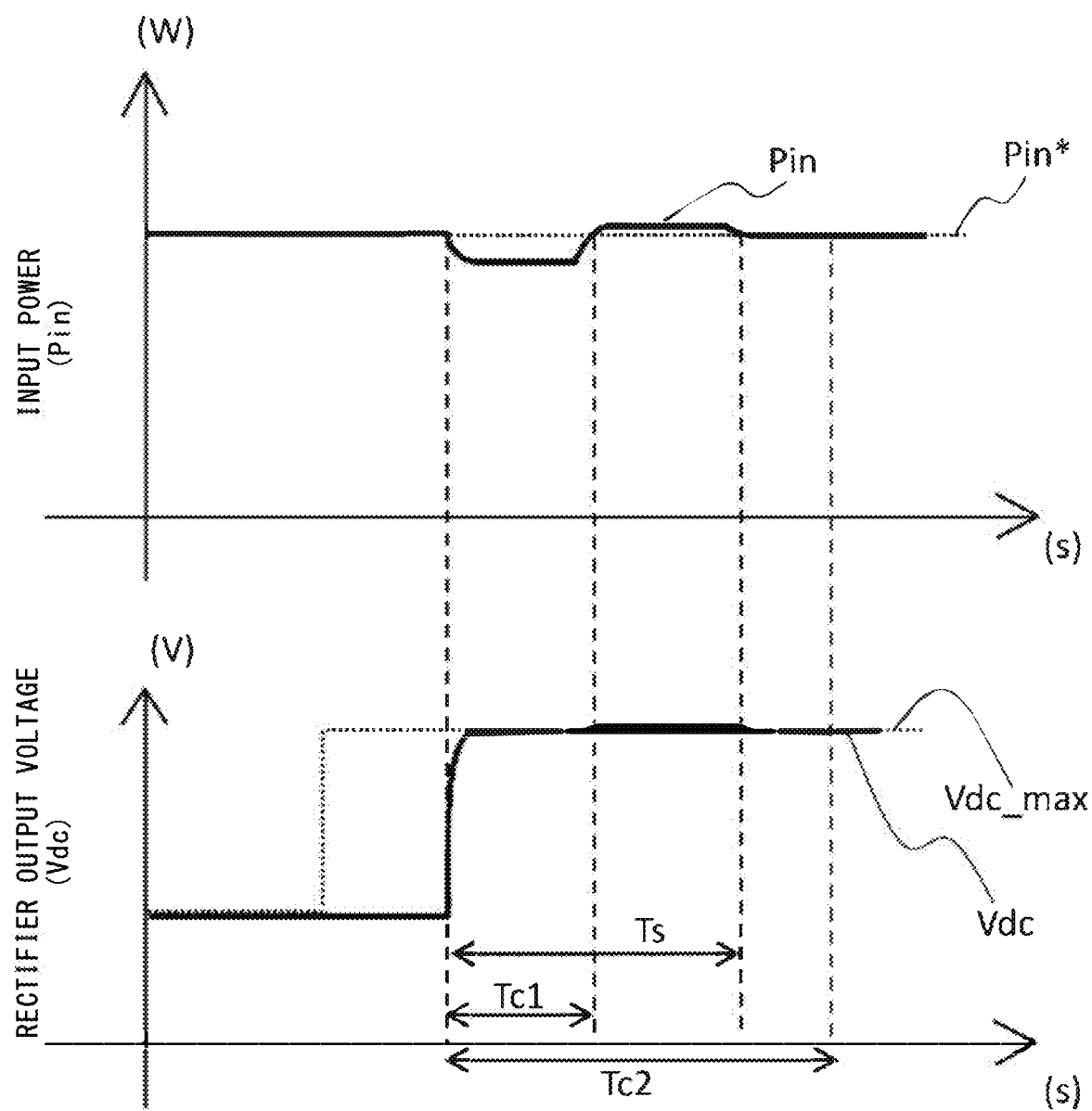
FIG. 7 is a diagram of comparing temporal variation of the input power and temporal variation of the rectifier output voltage in embodiment 2.

Next, embodiment 2 is described with reference to FIG. 6 and FIG. 7. Parts that are the same as or correspond to those in FIG. 1 to FIG. 5 are denoted by the same reference characters, and the description thereof is omitted. Each of FIG. 6 and FIG. 7 is a diagram of comparing temporal variation of the input power Pin and temporal variation of the rectifier output voltage Vdc. Each of FIG. 6 and FIG. 7 shows temporal variations of the input power Pin and the rectifier output voltage Vdc when input power control is performed such that the input power Pin has the input power command value Pin* and reception voltage control is performed such that the rectifier output voltage Vdc becomes the maximum efficiency voltage Vdc_max. In each of FIG. 6 and FIG. 7, the maximum efficiency voltage Vdc_max as a control command value is changed stepwise. In FIG. 6, the control cycle of the reception voltage control is set to be equal to the control cycle of the input power control and to be shorter than the settling time of the input power control. In contrast, in FIG. 7 showing embodiment 2, a control cycle Tc2 of the reception voltage control is set to be not less than a settling time Ts of the input power control.

When the maximum efficiency voltage Vdc_max is changed in the reception voltage control, the reception voltage control is performed in the power reception device 82 so as to cause the rectifier output voltage Vdc to be the maximum efficiency voltage Vdc_max after the change. At this time, influence similar to that in the case of load variation appears in the inverter 12 of the power transmission device 81. Therefore, stability in the input power control is impaired, the input power Pin varies, and an error occurs between the input power Pin and the input power command value Pin*. As described above, control of the rectifier output voltage Vdc is performed on the assumption that the input power Pin is controlled to be constant. Therefore, when the input power Pin varies, an accurate maximum efficiency voltage Vdc_max cannot be calculated. In this case, the rectifier output voltage Vdc is controlled on the basis of the maximum efficiency voltage Vdc_max including an error, and the rectifier output voltage Vdc varies to a great extent. In addition, such variation in the rectifier output voltage Vdc causes deviation of the input power Pin. Thus, when the input power control and the reception voltage control interfere with each other and the rectifier output voltage Vdc and the input power Pin mutually cause variation in the counterpart, stable control is difficult to be performed, resulting in unstable control.

In FIG. 6, the control cycle of the input power control and the control cycle of the reception voltage control are equal to each other at a control cycle Tc, and the control cycle of the reception voltage control is shorter than the settling time of the input power control. Therefore, the maximum efficiency voltage Vdc_max is calculated each time on the basis of the input power Pin in a non-converged state. As a result, the rectifier output voltage Vdc is controlled using, as the command value, a maximum efficiency voltage Vdc_max1, Vdc_max2 including an error, whereby variation of the rectifier output voltage Vdc is caused. That variation in the input power Pin causes variation in the maximum efficiency voltage Vdc_max is explained from FIG. 5. That is, variation in the input power Pin causes variation in the power transmission efficiency η, and causes variation in the coupling coefficient and the maximum efficiency point (maximum efficiency voltage Vdc_max) at a certain rectifier output voltage Vdc. FIG. 5 shows that, when the power transmission efficiency η is increased at a certain rectifier output voltage Vdc, the coupling coefficient and the maximum efficiency voltage Vdc_max are increased, and when the power transmission efficiency η is decreased, the coupling coefficient and the maximum efficiency voltage Vdc_max are decreased.

In embodiment 2, as shown in FIG. 7, the control cycle Tc2 of the reception voltage control is not less than the settling time Ts of the input power control. Accordingly, after the maximum efficiency voltage Vdc_max has been changed and the rectifier output voltage Vdc has once reached the maximum efficiency voltage Vdc_max after the change, calculation in the next control step is performed after the input power Pin has converged on the input power command value Pin*. Therefore, the maximum efficiency voltage Vdc_max to be calculated can be accurately calculated, and the rectifier output voltage Vdc does not vary. The settling time Ts of the input power control is obtained in the designing stage of control of the power reception device 82, and thus, may be stored in advance in the memory of the power reception circuit control means 40.

For stabler control, the difference between a control cycle Tc1 of the input power control and the control cycle Tc2 of the reception voltage control is preferably set to be large. For example, it is conceivable that the control cycle Tc2 is set to be not less than 10 times the control cycle Tc1. The control cycle Tc2 of the reception voltage control only needs to be in a range of being able to follow variation in the maximum efficiency voltage Vdc_max. As described above, the maximum efficiency voltage Vdc_max is dependent on the coupling coefficient of magnetic coupling. Therefore, in a case where variation in the relative positions of the power-transmission-side coil 151 and the power-reception-side coil 251 is significant and variation in the coupling coefficient is also significant, such as when the power reception side moves at a high speed during power feeding, the upper limit of the control cycle Tc2 is decreased. Meanwhile, in a case where the power reception side is stopped and the relative positions of the power-transmission-side coil 151 and the power-reception-side coil 251 hardly vary, and the coupling coefficient also hardly varies, the upper limit of the control cycle Tc2 is increased.

In a case where an update cycle Tc2* of the maximum efficiency voltage Vdc_max is set separately from the control cycle Tc2, if the update cycle Tc2* is set to be not less than the settling time Ts of the input power control, the control cycle Tc1 of the input power control and the control cycle Tc2 of the reception voltage control may be equal to each other. In this case, the rectifier output voltage Vdc is controlled in the same control cycle as the input power Pin. However, since calculation and update of the maximum efficiency voltage Vdc_max are not performed until the input power Pin converges, the aforementioned control interference can be prevented. It should be noted that, since the update cycle Tc2* is longer than the control cycle Tc2, when the control cycle Tc2 is not less than the settling time Ts, the update cycle Tc2* is longer than the settling time Ts.

In FIG. 7, the maximum efficiency voltage Vdc_max as the control command value is changed stepwise, but the changing manner is not limited thereto.

Since the others are the same as in embodiment 1, the description thereof is omitted.

According to embodiment 2, effects similar to those in embodiment 1 can be obtained. In addition, the input power control and the reception voltage control can be stabilized. More specifically, the control cycle of the reception voltage control is set to be not less than the settling time of the input power control, thereby preventing control interference caused when the maximum efficiency voltage as the command value of the reception voltage control is changed. That is, since calculation of the maximum efficiency voltage based on input power in a non-converged state is avoided, reception voltage control based on a maximum efficiency voltage including an error is prevented from being performed. In addition, occurrence of control deviation in input power due to reception voltage control based on an erroneous command value is also prevented. Since control interference between the input power control and the reception voltage control is prevented, the respective controls are prevented from becoming unstable, whereby stabler controls can be realized.

In embodiment 2, the maximum efficiency voltage is used as the command value in the reception voltage control. However, the present application is not limited thereto. To any system in which change in the command value of the reception voltage control causes control interference between the input power control and the reception voltage control, embodiment 2 can be applied and the controls can be stabilized. For example, it is conceivable that embodiment 2 is applied to a system in which: a voltage receiving device is mounted on a movable body; and a command value of reception voltage control changes. In such a system, it is conceivable that, due to moving of the movable body during power feeding, the coupling coefficient varies to a great extent, resulting in unstable control. However, if the control cycle of the reception voltage control is set to be not less than the settling time of the input power control as in embodiment 2, the controls can be stabilized.

Embodiment 3

Figure 8:
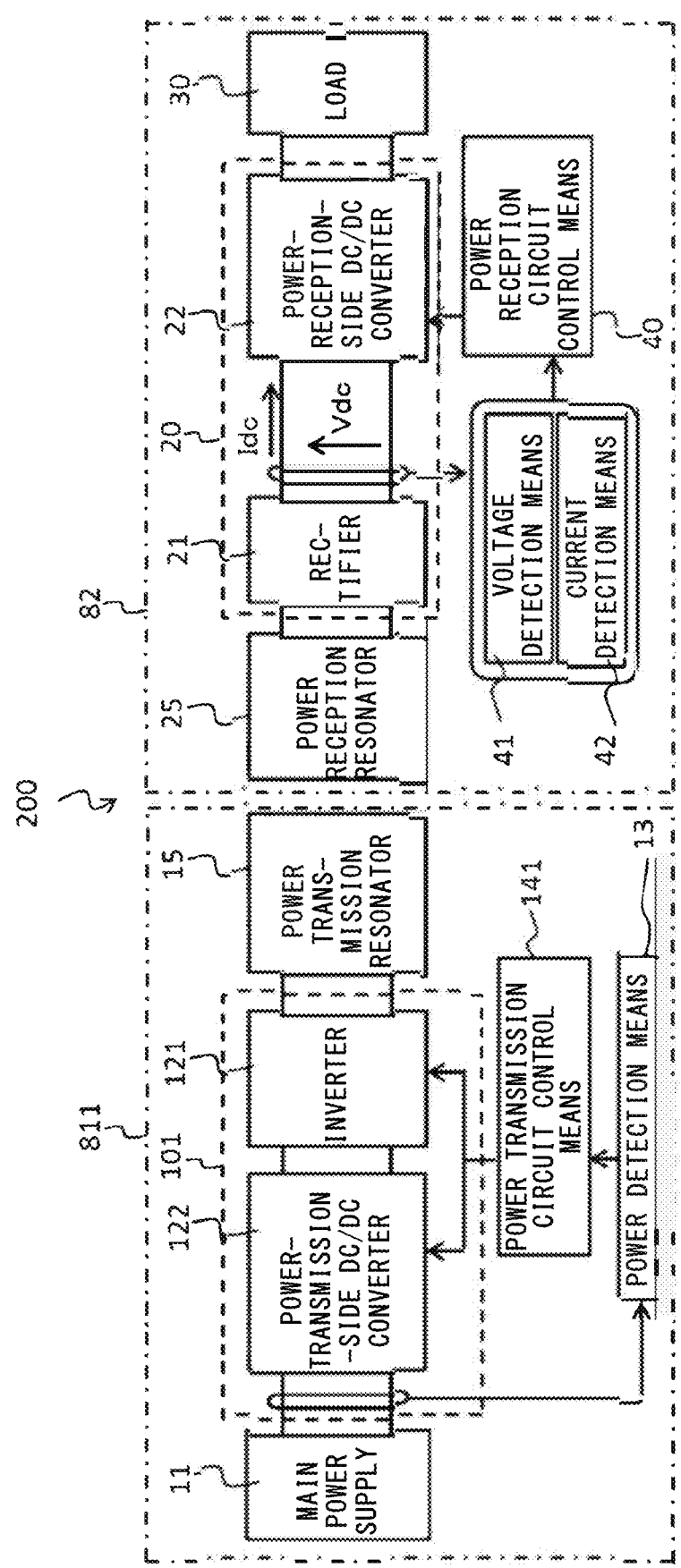
FIG. 8 is a configuration diagram showing a wireless power feeding system according to embodiment 3.

Next, embodiment 3 is described with reference to FIG. 8. Parts that are the same as or correspond to those in FIG. 1 are denoted by the same reference characters, and the description thereof is omitted. FIG. 8 is a configuration diagram showing a wireless power feeding system according to embodiment 3. Embodiment 3 is different from embodiment 1 in that, in Embodiment 3, the power transmission circuit portion includes a power-transmission-side DC/DC converter. A power transmission device 811 of a wireless power feeding system 200 includes: the main power supply 11; a power transmission circuit portion 101 including an inverter 121 and a power-transmission-side DC/DC converter 122; the power detection means 13 which detects power between the main power supply 11 and the power-transmission-side DC/DC converter 122; a power transmission circuit control means 141 which controls the inverter 121 and the power-transmission-side DC/DC converter 122; and the power transmission resonator 15. The power-transmission-side DC/DC converter 122 may be an insulation-type DC/DC converter or may be a non-insulation-type DC/DC converter.

DC power from the main power supply 11 is inputted to the power-transmission-side DC/DC converter 122, and is converted to desired DC power by the power-transmission-side DC/DC converter 122. The inverter 121 converts the DC power outputted by the power-transmission-side DC/DC converter 122, to AC, and supplies the resultant AC power to the power transmission resonator 15. The power detection means 13 detects the DC power to be inputted from the main power supply 11 to the power-transmission-side DC/DC converter 122, and outputs the detection result to the power transmission circuit control means 141. On the basis of the detection result by the power detection means 13, the power transmission circuit control means 141 performs input power control such that DC input power Pin to be inputted to the power-transmission-side DC/DC converter 122 has a constant input power command value Pin*. Accordingly, power to be supplied to the power transmission resonator 15 is also controlled.

In embodiment 3, the power detection means 13 is connected between the main power supply 11 and the power-transmission-side DC/DC converter 122, to detect DC power to be inputted to the power-transmission-side DC/DC converter 122, and input power control is performed with respect to the DC power to be inputted to the power-transmission-side DC/DC converter 122. However, input power control may be performed using output power of the power-transmission-side DC/DC converter 122 as the input power Pin, and the power-transmission-side DC/DC converter 122 may be controlled such that the output power of the power-transmission-side DC/DC converter 122 becomes constant. In this case, the power detection means 13 is connected so as to detect power between the power-transmission-side DC/DC converter 122 and the inverter 121.

The inverter 121 only converts the DC power outputted by the power-transmission-side DC/DC converter 122, to AC power, and does not perform input power control, unlike the inverter 12 of embodiment 1.

The hardware configuration that realizes the power transmission circuit control means 141 is the same as the hardware configuration of the power transmission circuit control means 14 described with reference to FIG. 2. Although not shown, it is sufficient that the power transmission circuit control means 14 in FIG. 2 is replaced with the power transmission circuit control means 141, and the inverter 12 is replaced with the inverter 121 and the power-transmission-side DC/DC converter 122.

Since the others are the same as in embodiment 1, the description thereof is omitted.

According to embodiment 3, effects similar to those in embodiment 1 can be obtained. In addition, increase in switching loss in the input power control can be prevented. More specifically, the power transmission circuit portion includes the power-transmission-side DC/DC converter and the inverter, input power control is performed by the power-transmission-side DC/DC converter, and only conversion from DC power to AC power is performed in the inverter. When the input power control is performed in the inverter, phase shift control, output frequency change, and the like are required, and there is a possibility that soft switching cannot be performed depending on the input power command value. When soft switching cannot be performed, switching loss in the inverter is increased. In contrast, in embodiment 3, only conversion from DC power to AC power is performed in the inverter, and thus, the aforementioned increase in the switching loss can be prevented.

Since there is no restriction of operation frequency associated with control of the magnitude of the input power performed by the inverter, the degree of freedom in designing can be enhanced.

The above embodiments disclosed in the present application can be applied to any wireless power feeding system that includes one or more pairs of a power-transmission-side coil and a power-reception-side coil that are magnetically coupled. Therefore, the configurations of the power transmission resonator and the power reception resonator are not limited to those shown in FIG. 3. The above embodiments can also be applied to a non-resonance configuration.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS 10, 101 power transmission circuit portion
11 main power supply
12, 121 inverter
122 power-transmission-side DC/DC converter
13 power detection means
14, 141 power transmission circuit control means
14b memory
15 power transmission resonator
151 power-transmission-side coil
20 power reception circuit
21 rectifier
22 power-reception-side DC/DC converter
25 power reception resonator
251 power-reception-side coil
40 power reception circuit control means
81, 811 power transmission device
82 power reception device
100, 200 wireless power feeding system
Vdc rectifier output voltage
Vdc_max maximum efficiency voltage
Pin input power
Pin* input power command value
Tc, Tc1, Tc2 control cycle
Tc2* update cycle
Ts settling time

The invention claimed is:

1. A wireless power feeding system comprising:
a power transmission circuit portion to convert direct current (DC) power supplied from a main power supply, to alternating current (AC) power;
a power-transmission-side coil which is supplied with the AC power from the power transmission circuit portion;
input power controller to control the AC power to be supplied to the power-transmission-side coil by causing input power to the system to converge on a constant input power command value during a settling time determined in advance;
a power-reception-side coil which is magnetically coupled with the power-transmission-side coil supplied with the AC power from the power transmission circuit portion, and to which AC power is transmitted from the power-transmission-side coil through magnetic energy accumulated between the power-reception-side coil and the power-transmission-side coil;
a power reception circuit including a rectifier to convert the AC power transmitted to the power-reception-side coil, to DC, and a power-reception-side DC/DC converter to convert output voltage from the rectifier; and
reception voltage controller to perform reception voltage control in which the output voltage from the rectifier is converged to be a maximum efficiency voltage at which power transmission efficiency becomes maximum, wherein
when relative positions of the power-transmission-side coil and the power-reception-side coil are changed, the reception voltage controller obtains a degree of magnetic coupling between the power-transmission-side coil and the power-reception-side coil after the change of the relative positions on the basis of the output voltage from the rectifier, and updates the maximum efficiency voltage by calculating in real time a maximum efficiency voltage after the change of the relative positions on the basis of the degree of magnetic coupling, and
one or both of an update cycle of the maximum efficiency voltage and a control cycle of the reception voltage control are, in a range of being able to follow variation in the maximum efficiency voltage, not less than the settling time.

2. The wireless power feeding system according to claim 1, wherein
the reception voltage controller includes storage to store a correspondence relationship between the maximum efficiency voltage and a degree of magnetic coupling between the power-transmission-side coil and the power-reception-side coil, and when performing the reception voltage control, obtains the degree of magnetic coupling from a combination of the output voltage from the rectifier and the power transmission efficiency, and obtains the maximum efficiency voltage from the degree of magnetic coupling and the correspondence relationship.

3. The wireless power feeding system according to claim 1, wherein
the power transmission circuit portion comprises an inverter to convert the DC power supplied from the main power supply, to AC power, and comprises, between the main power supply and the inverter, power detector to detect input power of the inverter as input power to the system and to output a detection result to the input power controller, and the input power controller causes, on the basis of the detection result by the power detector, the input power of the inverter to converge on the constant input power command value.

4. The wireless power feeding system according to claim 1, wherein
the power transmission circuit portion comprises a power-transmission-side DC/DC converter to convert the DC power supplied from the main power supply, and an inverter to convert the DC power converted by the power-transmission-side DC/DC converter, to AC power, and comprises, between the main power supply and the power-transmission-side DC/DC converter, power detector to detect input power of the power-transmission-side DC/DC converter as input power to the system and to output a detection result to the input power controller, and the input power controller causes, on the basis of the detection result by the power detector, the input power of the power-transmission-side DC/DC converter to converge on the constant input power command value.

5. A power reception device of a wireless power feeding system in which power is transmitted, to the power reception device, from a power transmission device comprising input power controller to control alternating current (AC) power to be supplied to a power-transmission-side coil, by causing input power to the system to converge on a constant input power command value during a settling time determined in advance, the power reception device comprising:
a power-reception-side coil which is magnetically coupled with the power-transmission-side coil, and to which AC power is transmitted from the power-transmission-side coil through magnetic energy accumulated between the power-reception-side coil and the power-transmission-side coil;
a power reception circuit including a rectifier to convert the AC power transmitted to the power-reception-side coil, to direct current (DC), and a DC/DC converter to convert output voltage from the rectifier; and
reception voltage controller to perform reception voltage control in which the output voltage from the rectifier is converged to be a maximum efficiency voltage at which power transmission efficiency becomes maximum, wherein
when relative positions of the power-transmission-side coil and the power-reception-side coil are changed, the reception voltage controller obtains a degree of magnetic coupling between the power-transmission-side coil and the power-reception-side coil after the change of the relative positions on the basis of the output voltage from the rectifier, and updates the maximum efficiency voltage by calculating in real time a maximum efficiency voltage after the change of the relative positions on the basis of the degree of magnetic coupling, and
one or both of an update cycle of the maximum efficiency voltage and a control cycle of the reception voltage control are, in a range of being able to follow variation in the maximum efficiency voltage, not less than the settling time.

6. The power reception device according to claim 5, wherein
the reception voltage controller includes storage to store a correspondence relationship between the maximum efficiency voltage and a degree of magnetic coupling between the power-transmission-side coil and the power-reception-side coil, and when performing the reception voltage control, obtains the degree of magnetic coupling from a combination of the output voltage from the rectifier and the power transmission efficiency, and obtains the maximum efficiency voltage from the degree of magnetic coupling and the correspondence relationship.

7. The wireless power feeding system according to claim 2, wherein the power transmission circuit portion comprises an inverter to convert the DC power supplied from the main power supply, to AC power, and comprises, between the main power supply and the inverter, power detector to detect input power of the inverter as input power to the system and to output a detection result to the input power controller, and the input power controller causes, on the basis of the detection result by the power detector, the input power of the inverter to converge on the constant input power command value.

8. The wireless power feeding system according to claim 1, wherein the power transmission circuit portion comprises an inverter to convert the DC power supplied from the main power supply, to AC power, and comprises, between the power-transmission-side coil and the inverter, power detector to detect output power of the inverter as input power to the system and to output a detection result to the input power controller, and the input power controller causes, on the basis of the detection result by the power detector, the output power of the inverter to converge on the constant input power command value.

9. The wireless power feeding system according to claim 2, wherein the power transmission circuit portion comprises an inverter to convert the DC power supplied from the main power supply, to AC power, and comprises, between the power-transmission-side coil and the inverter, power detector to detect output power of the inverter as input power to the system and to output a detection result to the input power controller, and the input power controller causes, on the basis of the detection result by the power detector, the output power of the inverter to converge on the constant input power command value.

10. The wireless power feeding system according to claim 2, wherein the power transmission circuit portion comprises a power-transmission-side DC/DC converter to convert the DC power supplied from the main power supply, and an inverter to convert the DC power converted by the power-transmission-side DC/DC converter, to AC power, and comprises, between the main power supply and the power-transmission-side DC/DC converter, power detector to detect input power of the power-transmission-side DC/DC converter as input power to the system and to output a detection result to the input power controller, and the input power controller controls causes, on the basis of the detection result by the power detector, the input power of the power-transmission-side DC/DC converter to be constant to converge on the constant input power command value.

11. The wireless power feeding system according to claim 1, wherein the power transmission circuit portion comprises a power-transmission-side DC/DC converter to convert the DC power supplied from the main power supply, and an inverter to convert the DC power converted by the power-transmission-side DC/DC converter, to AC power, and comprises, between the inverter and the power-transmission-side DC/DC converter, power detector to detect output power of the power-transmission-side DC/DC converter as input power to the system and to output a detection result to the input power controller, and the input power controller causes, on the basis of the detection result by the power detector, the output power of the power-transmission-side DC/DC converter to converge on the constant input power command value.

12. The wireless power feeding system according to claim 2, wherein the power transmission circuit portion comprises a power-transmission-side DC/DC converter to convert the DC power supplied from the main power supply, and an inverter to convert the DC power converted by the power-transmission-side DC/DC converter, to AC power, and comprises, between the inverter and the power-transmission-side DC/DC converter, power detector to detect output power of the power-transmission-side DC/DC converter as input power to the system and to output a detection result to the input power controller, and the input power controller causes, on the basis of the detection result by the power detector, the output power of the power-transmission-side DC/DC converter to converge on the constant input power command value.

* * * * *